US006761820B2

(12) United States Patent
Miller

(10) Patent No.: US 6,761,820 B2
(45) Date of Patent: Jul. 13, 2004

(54) PAINT-SLUDGE FILTRATION SYSTEM FEATURING POOL AERATION USING HIGH-PRESSURE DISCHARGE FROM FILTER VACUUM PRODUCER

(75) Inventor: James E. Miller, Troy, MI (US)

(73) Assignee: Air and Liquid Systems, Inc., Rochester Hills, MI (US)

( * ) Notice: Subject to any disclaimer, the term of this patent is extended or adjusted under 35 U.S.C. 154(b) by 162 days.

(21) Appl. No.: 10/217,549

(22) Filed: Aug. 13, 2002

(65) Prior Publication Data

US 2004/0031739 A1 Feb. 19, 2004

(51) Int. Cl.[7] .......................... B01D 36/04; C02F 1/24; C02F 9/00; B05B 15/04; B05B 15/12

(52) U.S. Cl. ................ 210/221.2; 210/167; 210/195.1; 210/196; 210/182; 210/186; 210/260; 210/297; 210/406; 210/771; 210/387

(58) Field of Search ............................ 210/221.2, 167, 210/195.1, 196, 182, 186, 260, 297, 387, 406, 771

(56) References Cited

U.S. PATENT DOCUMENTS 3,219,188 A * 11/1965 Hirs .......................... 210/108
4,585,557 A 4/1986 Turnquist
4,713,181 A * 12/1987 Russell ....................... 210/776
5,370,792 A * 12/1994 Bhatnagar et al. .......... 210/167
5,372,711 A * 12/1994 Sill ........................... 210/122
5,702,240 A 12/1997 O'Neal et al.
5,840,187 A * 11/1998 Derenthal et al. .......... 210/400

FOREIGN PATENT DOCUMENTS

EP 438264 A2 * 7/1991 .......... B01D/21/02

* cited by examiner

*Primary Examiner*—Thomas M. Lithgow
(74) *Attorney, Agent, or Firm*—Brinks Hofer Gilson & Lione

(57) ABSTRACT

A paint overspray particulate filtration system includes a collection tank, a floatation consolidation tank, and a vacuum filter assembly having a filter medium that traverses a pair of vacuum chambers. A positive displacement vacuum producer for the first vacuum chamber discharges a first supply of pressurized air at a temperature preferably greater than about 170° F. and a pressure preferably greater than about 6 psig, while a centrifugal compressor discharges a second supply of pressurized air at a temperature of perhaps up to 110° F. and at a pressure of perhaps 4 psig. The first pressurized air supply is heat exchanged with the second pressurized air supply, whereupon the cooled first pressurized air supply is directed through a submerged diffuser nozzle to aerate the collection tank and/or the consolidation tank. The warmed second pressurized air supply is directed onto the paint sludge carried atop the filter medium to enhance sludge dewatering.

23 Claims, 1 Drawing Sheet

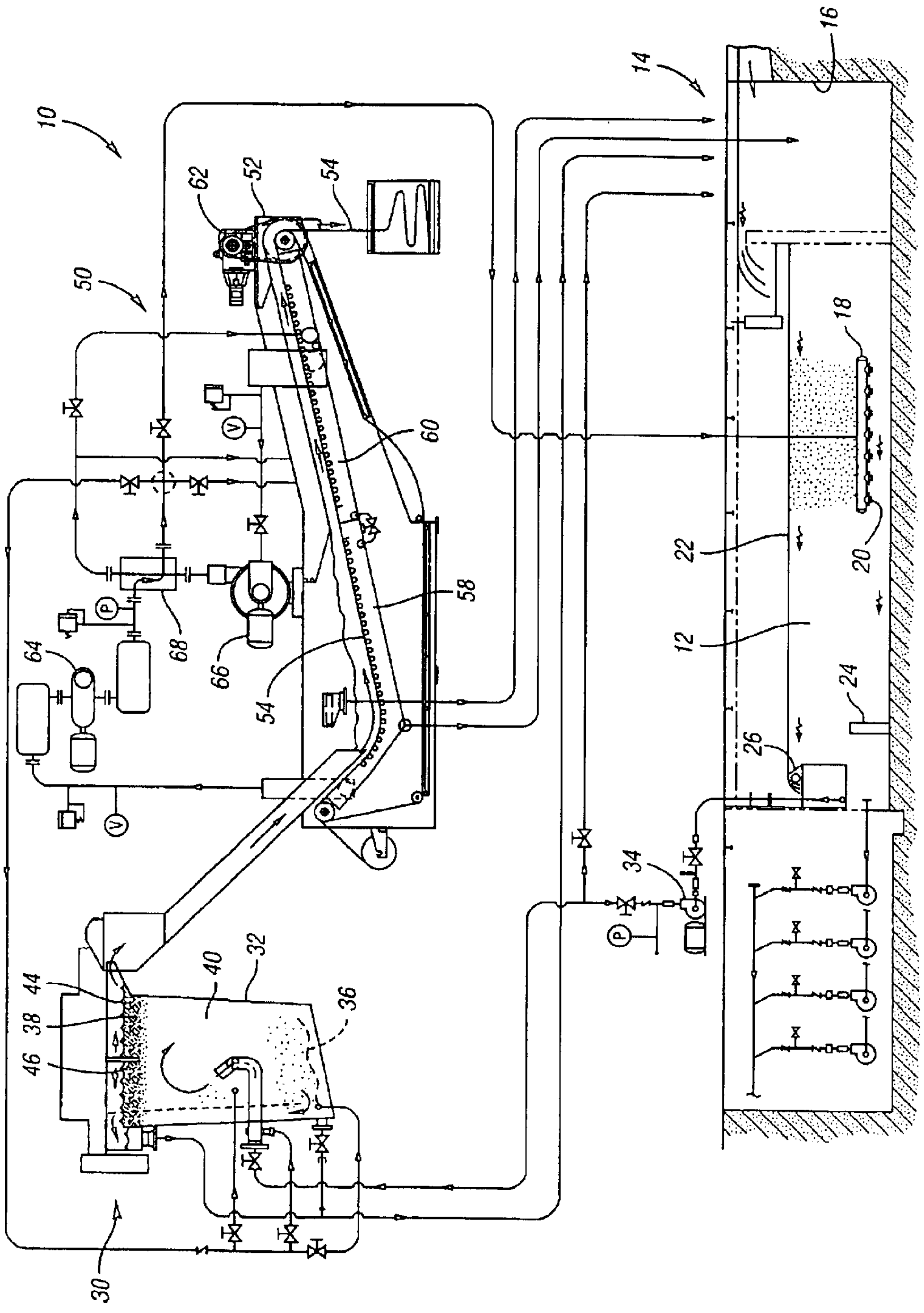
10
50
62
52
54
60
58
66
64
68
54
14
16
18
20
22
12
24
26
34
30
32
40
36
44
38
46

PAINT-SLUDGE FILTRATION SYSTEM FEATURING POOL AERATION USING HIGH-PRESSURE DISCHARGE FROM FILTER VACUUM PRODUCER

BACKGROUND OF THE INVENTION

The invention relates to systems for filtering, i.e., separating, concentrating, and dewatering, relatively fine particles entrained in a fluid to thereby obtain a consolidated, semi-solid material or "sludge."

For example, a common technique for capturing paint overspray/airborne paint particulate produced when operating a paint spray booth is to capture such particulate in a waterfall backdrop within the spray booth. The resulting water-and-particulate fluid mixture is then channeled into a suitable filtration system in which the paint particulate is substantially removed from the water. The filtered water is thereafter advantageously recirculated back to the spray booth's waterfall backdrop to capture more airborne paint particulate.

Such known filtration systems typically receive the water-and-particulate fluid mixture in a large collection tank or "pit," for example, by gravity feed. The paint particulate is then separated, consolidated, and dewatered in a multistage process. By way of example, in a typical first separation stage, a supply of compressed air from an external source is directed through a diffusing nozzle assembly into the collection tank near the collection tank bottom. The supply of compressed air is provided, for example, at perhaps about 2 psig from a centrifugal blower, or at perhaps up to about 5 psig from a throttled plant compressed air supply, with the air delivery pressure generally being prescribed as a function of the depth at which the nozzle assembly is positioned below the surface of the fluid mixture collected in the collection tank.

The compressed air exits the nozzle assembly in the form of small bubbles which thereafter rise up to the surface of the collection tank. As the bubbles rise, the entrained particulate adheres to the bubbles through surface tension, and the particulate is gently carried by the bubbles up to the surface of the collection tank. A mechanical separator, such as a weir, positioned near the surface of the fluid collected in the collection tank, completes the first stage of the process by "skimming off" or separating the uppermost layers of water-laden particulate from the surface of the fluid. A pump thereafter transfers the separated water-laden particulate into a floatation consolidation tank, also known as a floatation consolidator or "Palin," for a second stage of the filtration process.

Once in the consolidation tank, a typical second, consolidation stage begins, in which a further external supply of compressed air, similarly ranging up to about 5 psig and typically at or below ambient temperature, is directed through a diffusing nozzle positioned at a predetermined depth in the consolidation tank. Once again, the particulate is carried to the surface by the resulting air bubbles and, as more particulate rises, the raised particulate begins to build up above the nominal surface of the pool collected within the consolidation tank. As the rising bubbles percolate through the raised particulate layer, the rising bubbles further serve to aerate the raised particulate layer to release free water and thereby reduce the water content of the uppermost layers. A mechanical separator, such as a reciprocating surface scraper, periodically collects the uppermost layers that have "consolidated" proximate to the pool surface in preparation for the third and final stage of the filtration process.

The consolidated wet paint sludge is thereafter transferred, for example, via a chute onto a moving water-permeable filter medium of a vacuum filter assembly, whereupon the filter medium carries the consolidated wet paint sludge over one or more vacuum chambers. A vacuum producer, such as a centrifugal blower capable of generating a vacuum in the range of between 1 and 4 in.Hg, draws air from each vacuum chamber and, hence, operates to draw water from the wet paint sludge, resulting in the desired dewatered paint sludge. In a known variant, the blower's discharge air is directed onto the wet paint sludge atop the filter medium as it traverses the ramp to further enhance the dewatering effect of the vacuum filter assembly.

BRIEF SUMMARY OF THE INVENTION

It is an object of the invention to provide a system for filtering a fluid mixture including paint particulate and water that provides improved performance over such known filtration systems as described above while further eliminating the need for an external supply of compressed air with which to provide aeration of either the collection tank or the consolidation tank.

It is another object of the invention to provide a system for filtering a fluid mixture including paint particulate and water featuring an integrated vacuum producer capable of providing a supply of compressed air suitable for use in connection with collection and/or consolidation tank aeration at relatively greater depths than is typical of prior art filtration systems that employ an external supply of compressed air.

Under the invention, a system is provided for filtering a fluid mixture that includes paint spray particulate and water to obtain a consolidated and substantially dewatered paint sludge. The system includes a first, collection tank adapted to receive a supply of the fluid mixture, the collection tank having a skimmer that mechanically separates water-laden particles from a surface of the fluid mixture collected in the first tank.

The system also includes a second, floatation consolidation tank that receives the separated, water-laden particulate from the collection tank, the consolidation tank having a surface scraper for collecting particulate that consolidates proximate to a surface of a liquid pool formed in the bottom of the consolidation tank, whereby the collected-and-consolidated particulate forms a wet paint sludge.

The system further includes a dewatering vacuum filter assembly having a water-permeable filter medium that moves atop a ramp over at least one, and most preferably two, vacuum chambers. The wet paint sludge is received on the filter medium, whereupon the filter medium carries the wet paint sludge over each vacuum chamber while the chamber's respective vacuum producer evacuates the vacuum chamber to thereby extract free water from the wet paint sludge.

In accordance with a feature of the invention, the first, "wet ramp" vacuum producer is a rotary positive displacement blower discharging a first supply of pressurized air at a pressure greater than about 5 psig and a temperature of at least about 140° F., and, most preferably, at a pressure greater than about 7 psig and a temperature greater than about 170° F. Further, under the invention, at least one of the collection tank and the consolidation tank includes an aerating diffuser assembly receiving and discharging, into the collection tank or the consolidation tank at a predetermined depth beneath the surface of the fluid mixture or the surface of the pool, respectively, at least a portion of the first supply of pressurized air discharged from the positive displacement blower.

In accordance with another feature of the invention, in a preferred embodiment, a second, "dry ramp" vacuum producer draws air from a second vacuum chamber disposed beneath the moving filter medium in series with the first vacuum chamber. The second vacuum producer which, in a constructed embodiment, is conveniently a centrifugal blower, generates a second supply of pressurized air at roughly ambient temperature and at a discharge pressure of up to about 4 psig. The second supply of pressurized air is directed onto the wet paint sludge atop the filter medium to thereby enhance dewatering.

Most preferably, the relatively-hotter first supply of pressurized air is heat exchanged with the relatively-cooler second supply of pressurized air, whereby the temperature of the second supply of pressurized air is elevated to enhance paint sludge dewatering. In a preferred embodiment, the system includes a cross-flow heat exchanger such that the exit temperature of the second supply of pressurized air, as routed through the heat exchanger, may be greater than the exit temperature of the first supply of pressurized air (before the latter is routed to the diffusing nozzle assembly of either the collection tank or the consolidation tank, or both of them).

Other features, benefits, and advantages of the invention will be apparent upon reviewing the following description of an exemplary system in accordance with the invention.

BRIEF DESCRIPTION OF THE DRAWINGS

The Drawing is a diagrammatic view of an exemplary system for separating, consolidating, and dewatering a fluid mixture that includes paint spray particulate and water, in accordance with the invention.

DETAILED DESCRIPTION OF THE INVENTION

Referring to the Drawing, an exemplary system 10 is shown for separating, consolidating, and dewatering a fluid mixture 12 including paint particulate and water, as may be received from a paint spray booth (not shown) in which a waterfall backdrop is used to capture and entrain paint overspray. The exemplary system 10 generally includes three stages.

In the first, "separating" stage 14, a collection tank 16 receives the fluid mixture 12 containing paint particulate and water, for example, as by gravity feed. The collection tank 16 includes a fine bubble aeration system 18 with a ceramic diffuser assembly 20, as is available from Porex Porous Products, of Fairburn, Ga. A first portion of a first supply of pressurized air, the source of which is described in greater detail below, is directed through the membrane pores of the diffuser assembly 20 to form minute air bubbles that thereafter rise vertically through the collected fluid mixture 12 up toward the surface 22. The membrane pore size is preferably selected to provide minute air bubble size to match the paint particulate size that is to be carried to the surface 22 by the bubbles.

The collection tank 16 includes a weir box 24 that provides a weir 26 proximate to the surface 22 of the collected and aerated fluid mixture 12, for example, as taught in U.S. Pat. No. 5,372,711, the disclosure of which is hereby incorporated by reference. The weir 26 operates as a mechanical skimmer to separate, from the collected and aerated fluid mixture 12, the water-laden particulate that has risen up to the surface 22 due to collection tank aeration, in preparation for the system's next stage.

In the system's second, "consolidating" stage 30, a floatation consolidation tank 32 receives and collects water-laden particulate from the weir box 24, for example, as transferred into the consolidation tank 32 by a sludge pump 34. Preferably, the consolidation tank 32 also includes a submerged diffuser assembly 36, from which aerating bubbles are similarly discharged to carry the paint particulate up to the surface 38 of the liquid pool 40 formed within the consolidation tank 32.

In accordance with a feature of the invention, the consolidation tank's diffuser assembly 36 beneficially shares the same source of compressed air as the collection tank's diffuser assembly 20, as described below. By aerating the liquid pool 40 collected in the consolidation tank 32, the particulate within the consolidation tank 32 is carried to the surface by the resulting air bubbles. As more particulate rises, the raised particulate begins to build up in layers 44 above the nominal surface 38 of the liquid pool 40 collected within the consolidation tank 32. As the rising bubbles further percolate through the raised particulate layers, the rising bubbles further serve to aerate the raised particulate layers 44 to release free water and thereby reduce the water content of the uppermost layers 44.

While the invention contemplates use of any suitable device for separating the uppermost, "consolidated" layers 44 of raised particulate from the nominal surface 38 of the collected liquid pool 40, in the exemplary system 10, the consolidation tank 32 includes a surface scraper 46 that periodically reciprocates to urge the uppermost layers 44 of particulate onto an exit chute 48.

Referring again to the Drawing, the system's third, dewatering stage 50 further includes a vacuum filter assembly 52 featuring a water-permeable filter medium 54 which receives the separated paint sludge layers 44 from the consolidation tank's exit chute 48, as by gravity feed. The filter medium 54 travels, in series, on a ramp 56 over a first vacuum chamber 58 and a second vacuum chamber 60, as suitably driven by an electric motor 62. A first "wet ramp" vacuum producer in the form of a rotary positive displacement blower 64 generates a vacuum in the range of between about 3 and about 5 in.Hg within the first vacuum chamber 58, while a second "dry ramp" vacuum producer in the form of a centrifugal blower 66 generates a vacuum in the range of between about 1 and about 3 in.Hg within the second vacuum chamber 60.

In accordance with a feature of the invention, the positive displacement blower 64 discharges a first supply of pressurized air at a pressure of at least about 5 psig and, most preferably, greater than about 7 psig, while the centrifugal blower 66 discharges a second supply of pressurized air at a pressure of up to about 4 psig. By way of example only, a suitable series of positive displacement blowers for use with the invention is the "Dominator" series of blowers marketed by the Tuthill Pneumatics Group of Springfield, Mo. Similarly, by way of example only, a suitable centrifugal blower for use in generating the second supply of pressurized air is the Model M30-Millennium Series single stage centrifugal blower from National Turbine Corporation of Syracuse, N.Y.

In accordance with another feature of the invention, the first supply of pressurized air is discharged from the positive displacement blower 64 at a discharge temperature of at least about 140° F. and, most preferably, at a discharge temperature greater than about 170° F., while the second supply of pressurized air is discharged from the centrifugal blower 66 at roughly an ambient temperature. As illustrated in the Drawing, the vacuum filter assembly 50 of the exemplary system 10 further includes a cross-flow, air-to-air heat exchanger 68 that operates to transfer heat from the first supply of pressurized air to the second supply of pressurized air.

Thus, the heat generated by the positive displacement blower 64 and carried with the discharged first supply of pressurized air is transferred to the relatively-lower temperature discharge air from the centrifugal blower 66. The heat-exchanged (cooled) first supply of pressurized air is then routed to the diffuser assembly 20 of the collection tank 16 and/or the diffuser assembly 36 of the consolidation tank 32, with a relief valve 70 being operative to discharge a portion of the first supply of pressurized air onto the wet paint sludge atop the filter medium 54 in the event of an overpressure condition. Preferably, the temperature of the first supply of pressurized air is reduced, through heat-exchanging with the second supply of pressurized air, to a temperature of no greater than about 120° F. to improve plant safety. The heat-exchanged (heated) second supply of pressurized air which, in the exemplary system 10, has preferably been raised to a temperature of at least about 125° F. in the heat exchanger 68, is itself directed onto the wet paint sludge atop the ramp 56 to increase the drying capacity of the vacuum filter assembly 50.

At least a portion of the heat-exchanged first supply of pressurized air forms the compressed air supply for aerating the collection tank and/or the consolidation tank through their respective diffusing nozzle assemblies.

The pressure of the first supply of pressurized air used for aerating the collection tank 16 and/or the consolidation tank 32, as measured at the respective diffuser assemblies 20,36, is preferably determined based upon the following factors: 1) the liquid level within the tank (or tanks) to be aerated relative to the location of the tank's respective diffuser assembly; 2) the site elevation above sea level; 3) the pressure losses through the system's piping, valves, fittings, and air-to-air heat exchanger 68; 4) the pressure loss through each diffuser assembly's manifold; and 5) the vacuum sought to be achieved within each vacuum chamber 58,60. To the extent that the discharge pressure achieved by the positive displacement blower 64 exceeds that required for either the collection tank 16 or the consolidation tank 32, it will be appreciated that the invention contemplates use of a suitable throttling orifice (not shown) by which to reduce each diffuser assembly's supply pressure to a desired level.

While an exemplary system 10 for obtaining a consolidated paint sludge is described above, it will be appreciated that the exemplary embodiment is not intended to limit the scope of the following claims:

I claim:

1. A system for obtaining a consolidated paint sludge from a fluid mixture that includes paint spray particulate and water, the system comprising:

a collection tank receiving a supply of the fluid mixture, the collection tank including a skimmer mechanically separating water-laden particles from a surface of the fluid mixture collected in the collection tank;

a floatation consolidation tank receiving the separated water-laden particles from the collection tank, the consolidation tank including a surface scraper for collecting particles consolidating proximate to a surface of a liquid pool formed in the bottom of the consolidation tank, the consolidated particles forming a wet paint sludge; and a dewatering vacuum filter assembly including a moving filter medium adapted to receive the wet paint sludge from the consolidation tank, the filter medium carrying the wet paint sludge atop a first ramp over a first vacuum chamber, and a first vacuum producer evacuating the first vacuum chamber to extract free water from the wet paint sludge, wherein the first vacuum producer is a rotary positive displacement blower discharging a first supply of pressurized air at a pressure greater than about 5 psig and a temperature of at least about 140° F., and wherein at least one of the collection tank and the consolidation tank includes a diffuser nozzle assembly receiving and discharging at least a first portion of the first supply of pressurized air into the collection tank or the consolidation tank at a predetermined depth beneath the surface of the fluid mixture or the surface of the pool, respectively.

2. The system of claim 1, wherein the positive displacement blower discharges the first supply of pressurized air at a pressure of at least about 7 psig.

3. The system of claim 1, wherein a second portion of the first supply of pressurized air is directed onto the wet paint sludge carried by the filter medium.

4. The system of claim 3, wherein the second portion of the first supply of pressurized air is controlled by a relief valve.

5. The system of claim 1, wherein the positive displacement blower discharges the first supply of pressurized air at a temperature of at least about 170° F.

6. The system of claim 5, wherein the positive displacement blower discharges the first supply of pressurized air at a temperature greater than about 180° F.

7. The system of claim 1, wherein the temperature of the first supply of pressurized air as received by the diffuser assembly is no greater than about 125° F.

8. The system of claim 1, wherein the filter medium carries the paint sludge atop a second ramp over a second vacuum chamber after traversing the first ramp, and wherein the vacuum filter assembly includes a second vacuum producer drawing air from the second vacuum chamber, the second vacuum producer discharging a second supply of pressurized air at a pressure significantly below the pressure of the first supply of pressurized air.

9. The system of claim 6, wherein the second vacuum producer discharges the second supply of pressurized air at a pressure no greater than about 4 psig.

10. The system of claim 8, wherein at least a portion of the second supply of pressurized air is directed onto the wet paint sludge carried by the filter medium as the wet paint sludge traverses the second ramp, whereby the extraction of free water from the wet paint sludge traversing the second ramp is accelerated.

11. The system of claim 8, wherein the temperature of the first supply of pressurized air as discharged from the first vacuum producer is significantly greater than the temperature of the second supply of pressurized air as discharged from the second vacuum producer, and further including an air-to-air heat exchanger, the first and second supplies of pressurized air being directed through the heat exchanger to thereby transfer heat from the first supply of pressurized air to the second supply of pressurized air.

12. The system of claim 11, wherein the heat exchanger is of a cross-flow design, wherein the first supply of pressurized air exits the heat exchanger at a temperature less than about 125° F., and wherein the second supply of pressurized air exits the heat exchanger at a temperature greater than about 120° F.

13. The system of claim 8, wherein the first vacuum producer is a rotary positive displacement blower, and wherein the second vacuum producer is a centrifugal blower.

14. A system for obtaining a paint sludge from a fluid mixture that includes paint spray particulate, the system comprising:

a rotary positive displacement blower discharging a first supply of pressurized air at a pressure greater than about 5 psig and a temperature of at least about 140° F., a tank adapted to receive a supply of the fluid mixture, the tank including a mechanical separator operative to separate water-laden particulate from a surface of the fluid mixture collected in the tank to obtain a wet paint sludge, and a diffuser assembly within the tank receiving and discharging at least a first portion of the first supply of pressurized air into the tank at a predetermined depth beneath the surface of the collected fluid mixture, the temperature of the first supply of pressurized air as received by the diffuser assembly being no greater than 125° F., and a dewatering vacuum filter assembly including a moving filter medium adapted to receive separated water-laden particulate, the filter medium carrying the separated water-laden particulate atop a ramp over a vacuum chamber, and a vacuum producer evacuating the vacuum chamber to extract free water from the wet paint sludge, the vacuum producer discharging a second supply of pressurized air, wherein the second supply of pressurized air as discharged from the vacuum producer is at a pressure significantly below the pressure of the first supply of pressurized air, and wherein the second supply of pressurized air is directed onto the wet paint sludge as the wet paint sludge traverses a second ramp, whereby the drying of the wet paint sludge traversing the second ramp is accelerated.

15. The system of claim 14, wherein the first supply of pressurized air is at a pressure of at least about 7 psig.

16. The system of claim 15, wherein the first supply of pressurized air is discharged at a temperature of at least about 170° F.

17. The system of claim 16, wherein the first supply of pressurized air is discharged at a temperature of at least about 180° F.

18. The system of claim 14, wherein a second portion of the first supply of pressurized air is directed onto the wet paint sludge carried by the filter medium.

19. The system of claim 18, wherein the second portion of the first supply of pressurized air is controlled by a relief valve.

20. The system of claim 14, wherein the temperature of the first supply of pressurized air as discharged from the positive displacement blower is significantly greater than the temperature of the second supply of pressurized air as discharged from the vacuum producer, and further including an air-to-air heat exchanger, the first and second supplies of pressurized air being directed through the heat exchanger to thereby transfer heat from the first supply of pressurized air to the second supply of pressurized air.

21. The system of claim 20, wherein the first supply of pressurized air exits the heat exchanger at a temperature less than about 125° F.

22. The system of claim 21, wherein the second supply of pressurized air exits the heat exchanger at a temperature greater than about 120° F.

23. The system of claim 18, wherein the vacuum producer is a centrifugal blower.

* * * * *

UNITED STATES PATENT AND TRADEMARK OFFICE

CERTIFICATE OF CORRECTION

PATENT NO. : 6,761,820 B2
DATED : July 13, 2004
INVENTOR(S) : James E. Miller

It is certified that error appears in the above-identified patent and that said Letters Patent is hereby corrected as shown below:

Column 6,
Line 10, delete “nozzle”.

Signed and Sealed this

Twenty-third Day of November, 2004

JON W. DUDAS
*Director of the United States Patent and Trademark Office*